United States Patent
Straub et al.

(10) Patent No.: US 10,311,132 B2
(45) Date of Patent: Jun. 4, 2019

(54) HIGH PERFORMANT AND HIGH FIDELITY PREVIEWS FOR CSS PREPROCESSING FRAMEWORKS

(71) Applicant: Oracle International Corporation, Redwood Shores, CA (US)

(72) Inventors: Christian David Straub, Palo Alto, CA (US); Peter Tehchuan Liu, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/484,971

(22) Filed: Apr. 11, 2017

(65) Prior Publication Data

US 2017/0220528 A1 Aug. 3, 2017

Related U.S. Application Data

(63) Continuation of application No. 14/486,773, filed on Sep. 15, 2014, now Pat. No. 9,632,991.

(51) Int. Cl.
| | |
|---|---|
| *G06F 17/20* | (2006.01) |
| *G06F 17/21* | (2006.01) |
| *G06F 17/22* | (2006.01) |
| *H04L 29/08* | (2006.01) |
| *G06F 8/41* | (2018.01) |

(52) U.S. Cl.
CPC ............ *G06F 17/212* (2013.01); *G06F 8/423* (2013.01); *G06F 17/217* (2013.01); *G06F 17/227* (2013.01); *H04L 67/02* (2013.01); *H04L 67/2823* (2013.01)

(58) Field of Classification Search
None
See application file for complete search history.

(56) References Cited

U.S. PATENT DOCUMENTS

| | | |
|---|---|---|
| 6,589,291 B1 | 7/2003 | Boag et al. |
| 7,747,782 B2 | 6/2010 | Hunt et al. |
| 2003/0037076 A1 | 2/2003 | Bravery et al. |
| 2003/0151621 A1 | 8/2003 | McEvilly et al. |
| 2007/0100920 A1 | 5/2007 | Funnekotter et al. |
| 2007/0245231 A1 | 10/2007 | Kibler |
| 2009/0083256 A1 | 3/2009 | Thompson et al. |
| 2009/0083257 A1 | 3/2009 | Bargeron et al. |
| 2009/0274452 A1 | 11/2009 | Hamersley |
| 2012/0330984 A1 | 12/2012 | Fablet et al. |
| 2013/0013305 A1 | 1/2013 | Thompson et al. |

(Continued)

OTHER PUBLICATIONS

U.S. Appl. No. 14/486,773, Non-Final Office Action dated Aug. 22, 2015, 12 pages.

(Continued)

*Primary Examiner* — Keith D Bloomquist
(74) *Attorney, Agent, or Firm* — Kilpatrick Townsend & Stockton LLP

(57) ABSTRACT

In various embodiments, methods, systems, and non-transitory computer-readable media are disclosed that allow allows developers of user interfaces to see quick and accurate previews after changing content that needs to be processed via a cascading style sheet (CSS) framework such as LESS, SASS, or Trinidad. These frameworks typically take a significant period of time to transform their framework code into CSS.

16 Claims, 7 Drawing Sheets

(56) References Cited

U.S. PATENT DOCUMENTS

| | | |
|---|---|---|
| 2015/0040000 A1 | 2/2015 | Rice et al. |
| 2015/0264423 A1 | 9/2015 | Torgemane et al. |
| 2016/0070813 A1* | 3/2016 | Unter Ecker ..... G06F 17/30896 715/234 |
| 2016/0078006 A1 | 3/2016 | Straub et al. |
| 2016/0110324 A1 | 4/2016 | Hao |

OTHER PUBLICATIONS

U.S. Appl. No. 14/486,773, Notice of Allowance dated Jan. 4, 2017, 7 pages.

* cited by examiner

HIGH PERFORMANT AND HIGH FIDELITY PREVIEWS FOR CSS PREPROCESSING FRAMEWORKS

CROSS-REFERENCE TO RELATED APPLICATION

This application is a continuation of, and claims the benefit and priority of application Ser. No. 14/486,773, filed Sep. 15, 2014, entitled "HIGH PERFORMANT AND HIGH FIDELITY PREVIEWS FOR CSS PREPROCESSING FRAMEWORKS," the disclosures of which is incorporated by reference herein for all purposes.

BACKGROUND OF THE INVENTION

An application refers to a software program, which on execution performs specific desired tasks. In general, several applications are executed in a run-time environment containing one or more of operating systems, virtual machines (e.g., supporting Java™ programming language), device drivers, etc., as is well known in the relevant arts.

Developers often use Application Development Frameworks (ADFs) (which are by themselves applications) for implementing/developing desired applications. An ADF provides a set of pre-defined code/data modules that can be directly/indirectly used in the development of an application. An ADF may also provide tools such as an IDE (integrated development environment), code generators, debuggers, etc. which facilitates a developer in coding/implementing the desired logic of the application in a faster/simpler manner.

In general, an ADF simplifies development of applications by providing re-usable components and integrated development environments, which application developers can use to define user interfaces and application logic by, for example, selecting components to perform desired tasks and defining the appearance, behavior, and interactions of the selected components. Some ADFs are based on a model-view-controller design pattern that promotes loose coupling and easier application development and maintenance. Oracle Application Development Framework is one example of an ADF that utilizes this design pattern.

Oracle ADF includes libraries of standards-based Java Server Faces (JSF) components with built-in HTML5 and Ajax functionality. With these components, web deployed user interfaces can be developed with a level of functionality and interactivity previously reserved for thick-client applications. The components offer data interaction, data visualization, and encapsulated browser side operations in a set of easy to use components that makes rich client application development easier than ever. Oracle ADF further provides a data-binding framework that simplifies binding UI to business services through a simple drag and drop operations in the IDE. This is done while still keeping the independence of the business service from consuming interfaces. With the framework, the UI developer is insulated from the underlying implementation of the business service layer. This makes the process of building the UI truly decoupled from the implementation of the business service layer, better positioning the application for implementation in a service-oriented architecture.

Cascading Style Sheets (CSS) frameworks can be used to theme or style web-based applications. A CSS framework is generally a pre-prepared software framework that is meant to allow for easier, more standards-compliant web design using the Cascading Style Sheets (CSS) language. Functional frameworks can come with more features and additional JavaScript based functions that are mostly design oriented and unobtrusive. Some notable and widely used examples are Bootstrap or Foundation. Very few frameworks will allow developers of a client interface to quickly change a framework's look and feel visually if that framework uses a CSS preprocessor. The reasons for this are because it is very expensive to perform the preprocessing instructions and it is difficult to run the preprocessing client side (usually because the frameworks are written in languages that cannot be run on a web browser).

Accordingly, what is desired is to solve problems relating to building application user interfaces using CSS frameworks, some of which may be discussed herein. Additionally, what is desired is to reduce drawbacks relating to building user interfaces using CSS frameworks, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In various embodiments, methods, systems, and non-transitory computer-readable media are disclosed that allow developers working within desktop applications to create application-specific documents that integrate with web-based applications. Using a desktop integration framework, a developer can design documents having components that provide user interfaces to data associated with data models of the web-based applications. In one aspect, how a component looks and is configured can be dynamically driven at runtime based on aspects of its underlying data model.

In various embodiments, a method is provided for that includes generating, by a computing system, a cascading style sheet (CSS) preview using a CSS preprocessor in response to receiving CSS source code; receiving, by the computing system, a change to the CSS source code; identifying, by the computing system, a partition of the CSS source code affected by the change; determining, by the computing system, whether the computing system has instructions for the identified partition that indicate how to apply one or more operations to obtain a first result of the change; generating, by the computing system, the first result in response to applying the one or more operations to the identified partition when the computing system has the instructions; and injecting, by the computer system, the first result into the CSS preview when the computing system has the instructions. The computing system has the instructions when the identified partition is sufficiently normalized to exclude elements written in a language of the CSS preprocessor such that the first result can be generated by the computing system using the instructions without having to use the CSS preprocessor.

In other embodiments, a non-transitory computer-readable medium is provided for storing a computer program product having a set of instructions which when executed by one or more processors associated with a computer system cause the one or more processors to generate a CSS preview using a CSS preprocessor in response to receiving CSS source code; receive a change to the CSS source code; identify partition of the CSS source code affected by the change; determine whether the computing system has instructions for the identified partition that indicate how to apply one or more operations to obtain a first result of the change; generate the first result in response to applying the one or more operations to the identified partition when the computing system has the instructions; send the change and the identified partition to a service that hosts the CSS preprocessor when the computing system does not have the instructions; receive a second result generated by the service applying the CSS preprocessor to the identified partition with the change; and inject the first result or the second result into the CSS preview. The computing system has the instructions when the identified partition is sufficiently normalized to exclude elements written in a language of the CSS preprocessor such that the first result can be generated by the computing system using the instructions without having to use the CSS preprocessor.

In some embodiments, a system is provided for that includes a memory storing a set of instructions which when executed by the processor cause the processor to: generate a CSS preview using a CSS preprocessor in response to receiving CSS source code; receive a change to the CSS source code; identify partition of the CSS source code affected by the change; determine whether the system has instructions for the identified partition that indicate how to apply one or more operations to obtain a first result of the change; generate the first result in response to applying the one or more operations to the identified partition when the system has the instructions; send the change and the identified partition to a service that hosts the CSS preprocessor when the system does not have the instructions; receive a second result generated by the service applying the CSS preprocessor to the identified partition with the change; and inject the first result or the second result into the CSS preview. The system has the instructions when the identified partition is sufficiently normalized to exclude elements written in a language of the CSS preprocessor such that the first result can be generated by the system using the instructions without having to use the CSS preprocessor.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF THE INVENTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Introduction

A. System Environment

Figure 1:
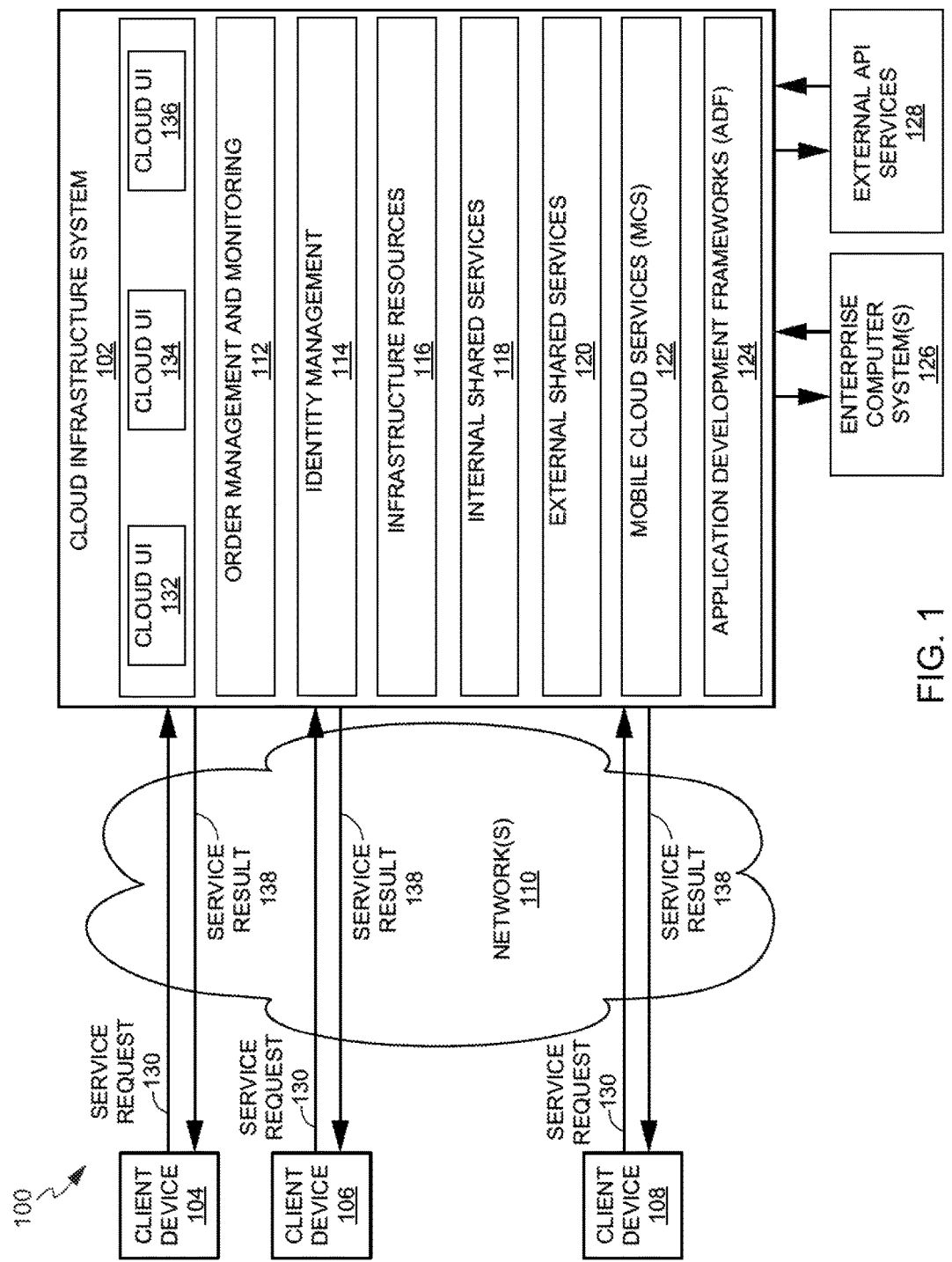
FIG. 1 is a simplified block diagram of components of a system environment by which services provided by the components of an embodiment system may be offered as mobile cloud services, in accordance with an embodiment of the present disclosure.

FIG. 1 is a simplified block diagram of one or more components of system environment 100 by which services provided by one or more components of an embodiment system may be offered as cloud services, in accordance with an embodiment of the present disclosure. In the illustrated embodiment, system environment 100 includes cloud infrastructure system 102 that provides cloud services to one or more client computing devices 104, 106, and 108. Client computing devices 104, 106, and 108 may be used by users to interact with cloud infrastructure system 102. Client computing devices 104, 106, and 108 may be configured to operate a client application such as a web browser, a proprietary client application (e.g., Oracle Forms), or some other application, which may be used by a user of the client computing device to interact with cloud infrastructure system 102 to use services provided by cloud infrastructure system 102.

It should be appreciated that cloud infrastructure system 102 depicted in FIG. 1 may have other components than those depicted. Further, the embodiment shown in FIG. 1 is only one example of a cloud infrastructure system that may incorporate an embodiment of the invention. In some other embodiments, cloud infrastructure system 102 may have more or fewer components than shown in FIG. 1, may combine two or more components, or may have a different configuration or arrangement of components.

Client computing devices 104, 106, and 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. Client computing devices 104, 106, and 108 can be general purpose personal computers including, by way of example, personal computers and/or laptop computers running various versions of Microsoft Windows®, Apple Macintosh®, and/or Linux operating systems. Client computing devices 104, 106, and 108 can be workstation computers running any of a variety of commercially-available UNIX® or UNIX-like operating systems, including without limitation the variety of GNU/Linux operating systems, such as for example, Google Chrome OS. Alternatively, or in addition, Client computing devices 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary system environment 100 is shown with three client computing devices, any number of client computing devices may be supported. Other devices such as devices with sensors, etc. may interact with cloud infrastructure system 102.

Network(s) 110 may facilitate communications and exchange of data between clients 104, 106, and 108 and cloud infrastructure system 102. Network(s) 110 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Cloud infrastructure system 102 may comprise one or more computers and/or servers. These computer systems or servers may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, one or more computer systems or servers associated with cloud infrastructure system 102 may be adapted to run one or more services or software applications described in the foregoing disclosure. For example, one or more computer systems or servers associated with cloud infrastructure system 102 may correspond to a server for performing processing described herein according to an embodiment of the present disclosure.

One or more computer systems or servers associated with cloud infrastructure system 102 may run an operating system including any of those discussed above, as well as any commercially available server operating system. One or more computer systems or servers associated with cloud infrastructure system 102 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In certain embodiments, services provided by cloud infrastructure system 102 may include a host of services that are made available to users of cloud infrastructure system 102 on demand, such as online data storage and backup solutions, Web-based e-mail services, hosted office suites and document collaboration services, database processing, managed technical support services, and the like. Services provided by cloud infrastructure system 102 can dynamically scale to meet the needs of its users. A specific instantiation of a service provided by cloud infrastructure system 102 is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service instance instantiated by cloud infrastructure 102 may include protected computer network access to storage, a hosted database, a hosted web server, a software application, or other service provided by a cloud vendor to a user, or as otherwise known in the art. For example, a service instance instantiated by cloud infrastructure 102 can include password-protected access to remote storage on the cloud through the Internet. As another example, a service instance instantiated by cloud infrastructure 102 can include a web service-based hosted relational database and a script-language middleware engine for private use by a networked developer. As another example, a service instance instantiated by cloud infrastructure 102 can include access to an email software application hosted on a cloud vendor's web site.

In certain embodiments, cloud infrastructure system 102 may include a suite of applications, middleware, development service, and database service offerings that are delivered to a customer in a self-service, subscription-based, elastically scalable, reliable, highly available, and secure manner. An example of such a cloud infrastructure system as embodied in cloud infrastructure service 102 is the Oracle Public Cloud provided by the present assignee.

Cloud infrastructure system 102 may provide the cloud services via different deployment models. For example, services may be provided under a public cloud model in which cloud infrastructure system 102 is owned by an organization selling cloud services (e.g., owned by Oracle) and the services are made available to the general public or different industry enterprises. As another example, services may be provided under a private cloud model in which cloud infrastructure system 102 is operated solely for a single organization and may provide services for one or more entities within the organization. The cloud services may also be provided under a community cloud model in which cloud infrastructure system 102 and the services provided by cloud infrastructure system 102 are shared by several organizations in a related community. The cloud services may also be provided under a hybrid cloud model, which is a combination of two or more different models.

In some embodiments, the services provided by cloud infrastructure system 102 may include one or more services provided under Software as a Service (SaaS) category, Platform as a Service (PaaS) category, Infrastructure as a Service (IaaS) category, or other categories of services including hybrid services. In some embodiments, the services provided by cloud infrastructure system 102 may include, without limitation, application services, platform services and infrastructure services. In some examples, application services may be provided by cloud infrastructure system 102 via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 102 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 102 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by cloud infrastructure system 102 and also control the deployed services. In some embodiments, platform services provided by cloud infrastructure system 102 may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in cloud infrastructure system 102. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 102 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 102, and the like. In various embodiments, cloud infrastructure system 102 may be adapted to automatically provision, manage, and track a customer's subscription to services offered by cloud infrastructure system 102. A customer, via a subscription order, may order one or more services provided by cloud infrastructure system 102. Cloud infrastructure system 102 then performs processing to provide the services in the customer's subscription order.

In one embodiment, as depicted in FIG. 1, cloud management functionality may be provided by one or more modules, such as order management and monitoring module 114. These modules may include or be provided using one or more computers and/or servers, which may be general purpose computers, specialized server computers, server farms, server clusters, or any other appropriate arrangement and/or combination.

In exemplary operation, a customer using a client device, such as one or more of client computing devices 104, 106 or 108, may interact with cloud infrastructure system 102 by requesting one or more services provided by cloud infrastructure system 102. The customer may issue service request 134 cloud infrastructure system 102 using a variety of means. Service request 134 may include placing an order for a subscription for one or more services offered by cloud infrastructure system 102, accessing one or more services offered by cloud infrastructure system 102, or the like. In certain embodiments, the customer may access a cloud User Interface (UI), cloud UI 132, cloud UI 134, and/or cloud UI 138 and place a subscription order via these UIs. The order information received by cloud infrastructure system 102 in response to the customer placing an order may include information identifying the customer and information identifying one or more services offered by the cloud infrastructure system 102 to which the customer intends to subscribe. After an order has been placed by the customer, the order information is received via the cloud UIs, 132, 134, and/or 138.

In this example, order management and monitoring module 114 sends information received from a customer to an order database to have the order placed by the customer stored in recorded. The order database can be one of several databases operated by cloud infrastructure system 102 and operated in conjunction with other system elements. Order management and monitoring module 114 may forward information that includes all or part of the order information stored in the order database to an order management module. In some instances, the order management module may be configured to perform billing and accounting functions related to the order, such as verifying the order, and upon verification, booking the order.

Order management and monitoring module 114 may communicate all or part of the order information to an order orchestration module that utilizes the order information to orchestrate the provisioning of services and resources for the order placed by the customer. In some instances, the order orchestration module may orchestrate the provisioning of resources to support the subscribed services using the services of an order provisioning module.

In certain embodiments, the order orchestration module enables the management of business processes associated with each order and applies business logic to determine whether an order should proceed to provisioning. Upon receiving an order for a new subscription, the order orchestration module sends a request to the order provisioning module to allocate resources and configure those resources needed to fulfill the subscription order. The order provisioning module enables the allocation of resources for the services ordered by the customer. The order provisioning module provides a level of abstraction between the cloud services provided by cloud infrastructure system 102 and the physical implementation layer that is used to provision the resources for providing the requested services. The order orchestration module may thus be isolated from implementation details, such as whether or not services and resources are actually provisioned on the fly or pre-provisioned and only allocated/assigned upon request.

In certain embodiments, order management and monitoring module 114 manages and tracks a customer's subscription order. In some instances, order management and monitoring module 114 may receive information indicative of any provisioned services and/or resources associated with the customer. Order management and monitoring module 114 may be configured to collect usage statistics for the services in the subscription order, such as the amount of storage used, the amount data transferred, the number of users, and the amount of system up time and system down time.

Once services and resources are provisioned in the above example, service result 138 may be sent to customers on client computing devices 104, 106, and/or 108 informing the customer of the provided services and/or resources. In instances where service request 130 includes a request to access a service or have a service perform one or more operations, service result 138 may be send to customers on client computing devices 104, 106, and/or 108 providing the requested access or results of any operations, services performed, or data requested.

In certain embodiments, cloud infrastructure system 100 may include identity management module 114. Identity management module 114 may be configured to provide identity services, such as access management and authorization services in cloud infrastructure system 102. In some embodiments, identity management module 114 may control information about customers who wish to utilize the services provided by cloud infrastructure system 102. Such information can include information that authenticates the identities of such customers and information that describes which actions those customers are authorized to perform relative to various system resources (e.g., files, directories, applications, communication ports, memory segments, etc.) Identity management module 114 may also include the management of descriptive information about each customer and about how and by whom that descriptive information can be accessed and modified.

In certain embodiments, cloud infrastructure system 102 may also include infrastructure resources 116 for providing the resources used to provide various services to customers of cloud infrastructure system 102. In one embodiment, infrastructure resources 116 may include pre-integrated and optimized combinations of hardware, such as servers, storage, and networking resources to execute the services provided by the PaaS platform and the SaaS platform.

In some embodiments, resources in cloud infrastructure system 102 may be shared by multiple users and dynamically re-allocated per demand. Additionally, resources may be allocated to users in different time zones. For example, cloud infrastructure system 102 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 118 may be provided that are shared by different components or modules of cloud infrastructure system 102 and by the services provided by cloud infrastructure system 102. These internal shared services 118 may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, a number of external shared services 120 may be provided that are shared by different components or modules of cloud infrastructure system 102 and by the services provided by cloud infrastructure system 102. These external shared services 120 may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In various embodiments, external shared services 120 may include one or more components that provide access, data transformation, automation, or the like to enterprise computer system(s) 126. Access to enterprise computer system(s) 126 may be shared by different components or modules of cloud infrastructure system 102 and by the services provided by cloud infrastructure system 102. In some embodiments, access to enterprise computer system(s) 126 may be shared by service instances provided by cloud infrastructure system 102 that are restricted to one or more subscribers.

In further embodiments, external shared services 120 may include external application programming interface (API) services 128 that are shared by different components or modules of cloud infrastructure system 102 and by the services provided by cloud infrastructure system 102. These external API services 128 may include, without limitation, APIs provided by other third party services or entities.

Various different mobile cloud services may be provided by mobile cloud service (MSC) 122 in cloud infrastructure system 102. MCS 122 facilitates communication between a mobile computing device and enterprise computer systems (e.g., enterprise computer systems 124 and 126) according to some embodiments of the present invention. MCS 122 may include one or more memory storage devices ("local storage") used to store enterprise data and authentication information. Enterprise data may be received from enterprise computer systems 126 or from client computing devices 104, 106, or 108 or may include enterprise data converted by cloud infrastructure system 102, or combinations thereof. Authentication information may be received from identity management system 116 and/or generated by cloud infrastructure system 102. In some embodiments, authentication information may include information indicating security authentication of a user with regard to a request for a service.

Enterprise computer systems, such as enterprise computer systems 126 may be physically located beyond a firewall of cloud infrastructure system 102 at a different geographic location (e.g., remote geographic location) than cloud infrastructure system 102. In some embodiments, enterprise computer systems 126 may include one or more different computers or servers. In some embodiments, enterprise computer systems 126 may be part of a single computer system.

In certain embodiments, enterprise computer systems 126 may communicate with cloud infrastructure system 102 using one or more different protocols. Each of enterprise computer systems 126 may communicate with cloud infrastructure system 102 using a different communication protocols. Enterprise computer systems 126 may support the same or different security protocols. In some embodiments, MSC 1112 may include an agent system to handle communication with enterprise computer systems 126.

A protocol may include a communication protocol, such as SPDY. A protocol may include an application protocol such as an HTTP-based protocol. In some embodiments, enterprise computer systems 126 may communicate with cloud infrastructure system 102 using a REST or SOAP communication protocols. For example, REST protocol may support a formats including URI or URL. Enterprise Data formatted for communication using REST protocol may be easily converted to data formats such as JSON, comma-separated values (CSV), and really simple syndication (RSS). Enterprise computer systems 126 and cloud infrastructure system 102 may communicate using other protocols such as remote procedure calls (RPC) (e.g., XML RPC).

In some embodiments, MCS 122 may include an adaptor interface configured to support communication with one or more services provided by cloud infrastructure service 102, some of which may support different protocols or techniques for communications. In some embodiments, MCS 122 may include an adaptor interface configured to support communication with enterprise computer systems 126, some of which may support different protocols or techniques for communications. MCS 122 may include one or more adaptors each of which may be configured to communicate according to a communication protocol, a type of enterprise computer system, a type of application, a type of service, or combinations thereof. A communication protocol supported by an adaptor may be specific to a service or one or more of enterprise computer systems 126.

In certain embodiments, client computing devices 104, 106, and 108 may each implement an application that can provide specific user interfaces to communicate with MCS 122. A specific UI may be configured to communicate using a specific communication protocol. In some embodiments, specific UIs may include callable interfaces, functions, routines, methods, and/or operations that may be invoked to communicate with MCS 122. Specific UIs may accept as input parameters for communicating with a service provided by cloud infrastructure service 102 or with enterprise computer systems 126 for enterprise data and/or to request a service. In some embodiments, communication through MCS 122 may be converted for communication using a custom communication protocol. In some embodiments, specific UIs may correspond to a custom client in an application.

MCS 122 may include one or more callable interfaces, e.g., an application programming interface (API). Callable interfaces associated with MCS 122 may enable an app on a mobile computing device to communicate requests to MCS 122. Callable interfaces associated with MCS 122 may support a common or standard interface, which may allow requests including their parameters to be received from apps according to a standardized protocol, architectural style, and/or format (e.g., a REST protocol). Callable interfaces associated with MCS 122 may be configurable by a user of any one of computing devices 104, 106, or 108. Callable interfaces associated with MCS 122 may receive requests for services according to a communication protocol. Device application developers can connect to MCS 122 for their custom applications. In some embodiments, a callable interface associated with MCS 122 may be configured by the same person that develops an app, such that the person can implement a custom app to communicate with MCS 122.

Callable interfaces associated with MCS 122 may further enable enterprise computer systems 126 to communicate with MCS 122 according to a standardized protocol or format. Similar to application developers, those who manage enterprise computer systems can implement code (e.g., an agent system) that is configured to communicate with MCS 122 via one or more callable interfaces. Callable interfaces associated with MCS 122 may be implemented based on a type of a computing device, a type of enterprise computer systems, an app, an agent system, a service, a protocol, or other criterion. In some embodiments, callable interfaces associated with MCS 122 may support requests for services including authentication, compression, encryption, pagination with cursors, client-based throttling, non-repudiation, logging, and metrics collection. In some embodiments, callable interfaces associated with MCS 122 may be implemented for custom business-related services, such as authentication, policy enforcement, caching of responses, throttling of calls to MCS 122, translation between asynchronous and synchronous patterns, logging of calls to underlying services, or combinations thereof. In some embodiments, callable interfaces associated with MCS 122 may enable users to load custom code for implementation by cloud infrastructure system 102. The custom code may implement one or more callable interfaces associated with MCS 122 for cloud infrastructure system 102, which can enable users to access custom services or other enterprise computer systems.

Protocol translators associated with MCS 122 may process a message to determine a communication protocol for a message and/or to convert a message to a communication protocol for a destination. Protocol translators associated with MCS 122 may convert a request received from client computing devices 104, 106, or 108. The request may be converted from a format of a communication protocol supported by client computing devices 104, 106, or 108 to a format of a communication protocol supported by a service provided by cloud infrastructure service 102 or enterprise computer systems 126. Protocol translators associated with MCS 122 may convert a response received from a service provided by cloud infrastructure service 102 or enterprise computer systems 126. A response may be converted from a format of a communication protocol supported by a service provided by cloud infrastructure service 102 or enterprise computer systems 126 to a format of a communication protocol supported by client computing devices 104, 106, or 108.

Security services associated with MCS 122 may manage security authentication for requests received from any of client computing devices 104, 106, or 108. Security services associated with MCS 122 may protect the integrity of customer processes and enterprise data. To prevent system or data from being compromised, security authentication may occur when a request is received from client computing devices 104, 106, or 108. Security authentication may be performed before a request is dispatched for processing by cloud infrastructure system 102. The security authentication determined for a user may enable a user associated with a mobile computing device to have authorization to request services via MCS 122. The security authentication may reduce efforts for a user to authenticate for different requests and/or services requested via MCS 122. Security services associated with MCS 122 may be implemented as one or more functional blocks or modules configured to perform various operations authenticating security of a request.

Authentication services associated with MCS 122 may manage security authentication for requests received from client computing devices 104, 106, or 108. Authentication services associated with MCS 122 may determine security authentication for a user associated with a computing device that sends a request to MCS 122. Security authentication may be determined based on a time period, which may be tied to operation of an app (e.g., launching an app), a request, a computing device, an enterprise computer system, other criterion related to a request, or combinations thereof. Security authentication may be verified and granted for any one of the following, such as an individual request, one or more enterprise computer systems, a particular service, a type of service, a user, a computing device, other criterion for determining security authentication, or combinations thereof. In some embodiments, cloud infrastructure system 102 may store authentication information of users received from enterprise computer systems or authentication systems supporting enterprise computer systems. Cloud infrastructure system 102 may determine authentication by performing a lookup function to determine whether an identity of a user associated with a request has authority to make such a request. The stored authentication information may include information such as the type of requests, functions, enterprise computer systems, enterprise data, or the like that a user may be authorized to access. In some embodiments, infrastructure system 102 may initiate communication with a requesting computing device to determine authentication.

In some embodiments, security authentication may be determined based on a role associated with a user requesting a service. The role may be associated with a user requesting access to MCS 122. In some embodiments, a user may request services as a subscriber or tenant of MCS 122 who may be granted access to resources and/or services provided by MCS 122. Authentication may correspond to a user's subscription to MCS 122, such that a user may be authorized to request services via MCS 122 as a subscriber. In some embodiments, the subscription may be limited to a particular set of resources provided by MCS 122. Security authentication may be based on the resources and/or services accessible to the user of MCS 122. In some embodiments, a request may be provisioned a template during execution called a "runtime environment." The runtime environment may be associated with resources that are allocated for a request, a user, or a device.

In some embodiments, authentication services associated with MCS 122 may request an identity management system to determine security authentication for the user. The identity management system may be implemented by cloud infrastructure system 102 (e.g., as identity management 114) or by another computer system that is external to cloud infrastructure system 102. Identity management 116 may determine security authentication of the user based on the user's role or subscription for accessing MCS 122. The role or subscription may be assigned privileges and/or entitlements with respect to an enterprise computer system, a service provided by an enterprise computer system, a function or feature of an enterprise computer system, other criterion for controlling access to an enterprise computer system, or combinations thereof.

Various different application development frameworks (ADFs) may be provided by application development frameworks (ADFs) 124 in cloud infrastructure system 102. ADFs 124 provide the infrastructure code to implement agile SOA based applications. ADFs 124 further provide a visual and declarative approach to development through one or more development tools (e.g., Oracle JDeveloper 11 g development tool). One or more frameworks provided by ADFs 124 may implement a Model-View-Controller design pattern. Such frameworks offer an integrated solution that covers all the layers of the MVC architecture with solutions to such areas as Object/Relational mapping, data persistence, reusable controller layer, rich Web user interface framework, data binding to UI, security and customization. Extending beyond the core Web based MVC approach; such frameworks also integrate with the Oracle SOA and WebCenter Portal frameworks simplifying the creation of complete composite applications.

In certain embodiments, ADFs 124 make it easy to develop agile applications that expose data as services by coupling a service interface to built-in business services provided by cloud infrastructure system 102. This separation of business service implementation details is performed in ADFs 124 via metadata. Use of this metadata-driven architecture enables application developers to focus on the business logic and user experience, rather than the details of how services are accessed. In certain embodiments, ADFs 124 store implementation details of services in metadata in a model layer. This enables developers to exchange services without modifying the user interface, making the application extremely agile. Additionally, the developer creating the user interface does not need to bother with business service access details. Instead, developers can focus on developing the application interface and interaction logic. Creating the user experience can be as simple as dragging-and-dropping the desired business services onto a visual page designer and indicating what type of component should represent that data.

In various embodiments, developers interact with ADFs 124 to create modules forming enterprise applications. The enterprise applications can be executed within the context of cloud infrastructure system 102. In various embodiments, developers interact with ADFs 124 to create modules forming mobile applications. The mobile applications can be executed within the context of cloud infrastructure system 102. Features of the present invention described below may be implemented using any desired combination of programming language and application development framework as will be apparent to one skilled in the relevant arts by reading the disclosure provided herein.

One or more frameworks provided by ADFs 124 may be embodied as Oracle ADF in one example. Accordingly, a framework in ADFs 124 can be based on a Model-View-Controller (MVC) design pattern. An MVC application is separated into: 1) a model layer that handles interaction with data-sources and runs the business logic, 2) a view layer that handles the application user interface, and 3) a controller that manages the application flow and acts as the interface between the Model and the View layers. Separating applications into these three layers simplifies maintenance and reuse of components across applications. The independence of each layer from the others results in a loosely coupled, Service Oriented Architecture (SOA).

In various embodiments, ADFs 124 provide tools and resources allowing developers to create an application in the form of multiple layers, each layer containing code modules/files implementing desired logic according to pre-defined specification. Thus, in one embodiment, ADFs 124 enables the application to be developed as four layers: a view layer containing code modules/files that provide the user interface of the application, a controller layer containing code modules that control the flow of the application, a model layer containing data/code modules that provide an abstraction layer for the underlying data, and a business services layer containing code modules that provide access to data from various sources and handles business logic.

In certain embodiments, ADFs 124 let developers choose the technology they prefer to use when implementing each of the layers. EJB, Web Services, JavaBeans, JPA/EclipseLink/TopLink objects, and many others can all be used as Business Services for ADFs 124. View layers can include Web based interfaces implemented with JSF, Desktop Swing applications and MS Office front ends, as well as interfaces for mobile devices.

In one aspect, the view layer represents the user interface of the application being developed. The view layer can include desktop, mobile, and browser-based views, each of which provides all or a portion of the user interface and is accessible in a variety of manners corresponding to view type. For example, web pages may be sent by the application in response to receiving client requests containing corresponding URLs. The web pages may then be displayed by a browser on a display unit (not shown) associated with a requesting client system, thereby enabling users of the requesting client system to interact with the enterprise application. ADFs 124 support multi-channel access to business services allowing reuse of business services and access from a Web client, a client-server swing desktop-based application, Microsoft Excel spreadsheets, mobile devices such as a smart-phone, or the like.

The code files/modules forming the view layer (such as web pages) may be implemented using one or more of hypertext markup language (HTML), Java server pages (JSP), and Java Server Faces (JSF). Alternatively, the user interface may be implemented using Java components such as Swing, and/or extensible markup language (XML). As further noted, the user interface may leverage a user's experience and familiarity with desktop applications, such as Word and Excel by Microsoft.

As noted above, the relevant user-developed code/data modules are provided in each of the layers. However, each layer typically contains other pre-defined code/data modules provided by ADFs 124. Some of the pre-defined modules may be used during development, for example, as templates for developing the web pages, for including desired functionality in the developed code etc. Other pre-defined modules (such as a URL rewriting module) may be deployed along with the developed application and may provide additional functionalities (mapping of requested URLs to internal names) to the user during execution of the enterprise application.

A controller layer contains code modules/files that control the flow of the application. Each controller object contains software instructions and/or data implemented according to a desired manner of presenting information in the view layer. The desired manner may include the specific web pages to be displayed when links in another web page are clicked/selected by the user, the page to be displayed when errors occur during execution, indicating the specific data to be stored/retrieved, etc.

In one aspect, the controller layer manages the applications flow and handles user input. For example, when a Search button is clicked on a page, the controller determines what action to perform (do a search) and where to navigate to (the results page). There are two controller options for web-based applications in JDeveloper: the standard JSF controller or the ADF Controller that extends the JSF controller functionality. Whichever controller is used, application flow is typically designed by laying out pages and navigation rules on a diagram. An application's flow can be broken into smaller, reusable task flows; include non-visual components such as method calls and decision points in a flow; and create "page fragment" flows that run inside a region of a single containing page.

The code modules/files forming the controller layer are often implemented as Java servlets receiving the client requests and sending desired web pages as corresponding responses. Controller objects may also be implemented, for example, as Apache Jakarta Struts controllers or according to the JSF standard.

A model layer contains data/code modules that connect various business services to the objects that use them in the other layers, such as to the controller objects discussed above or directly to desktop applications as shown. Each abstract data objects of the model layer provides a corresponding interface that can be used to access any type of business service, executing in an underlying business service layer. The data objects may abstract the business service implementation details of a service from a client and/or expose data control methods/attributes to view components, providing a separation of the view and data layers.

In one aspect, the model layer consists of two components, data controls and data bindings, which utilize metadata files to define the interface. Data controls abstract the business service implementation details from clients. Data bindings expose data control methods and attributes to UI components, providing a clean separation of the view and model. Due to the metadata architecture of the model layer, developers get the same development experience when binding any type of Business Service layer implementation to the View and Controller layers.

In certain embodiments, ADFs 124 emphasizes the use of the declarative programming paradigm throughout the development process to allow users to focus on the logic of application creation without having to get into implementation details. At a high level, the development process for a Fusion web application usually involves creating an application workspace. Using a wizard, libraries and configuration needed for technologies selected by a developer are automatically added and an application is structured into projects with packages and directories.

By modeling database objects, an online database or offline replica of any database can be created, definitions edited, and schemas updated. Using an UML modeler, use cases can then be created for the application. Application control and navigation can also be designed. Diagrammers can be used to visually determine the flow of application control and navigation. Then, an underlying XML file describing the flow can be automatically created. A resource library can be used to allow a developer to view and use imported libraries by simply dragging and dropping them into the application. From database tables, entity objects can be created using wizards or dialogs. From those entity objects, view objects are created to be used by pages in the application. Validation rules and other types of business logic can be implemented.

In this example, a business services layer manages interaction with a data persistence layer. It provides such services as data persistence, object/relational mapping, transaction management, and business logic execution. The business services layer can be implemented in any of the following options: as simple Java classes, EJB, Web services, JPA objects, and Oracle ADF Business Components. In addition, data can be consumed directly from files (XML or CSV) as well as REST. Thus, each business service manages interaction with a corresponding data persistence layer, and also provides such services as object/relational mapping, transaction management, business logic execution, etc. The business services layer may be implemented using one or more of simple Java classes, Enterprise Java Beans, web services, etc.

Business components represent a business service implemented using, for example, Oracle ADF Business Components, to provide interaction with databases, web services, legacy systems, application servers, and the like. In one embodiment, business components of the business services layer contain a mixture of application modules, view/query objects, and entity objects, which cooperate to provide the business service implementation. An application module can be a transactional component/code module that UI clients communicate with for working with application/transaction data. The application module may provide an updatable data model and also procedures/functions (commonly referred to as service methods) related to user transactions.

An entity object may represent a corresponding row in a database table and simplifies the manipulation (update, deletion, etc.) of the data stored in the corresponding row. An entity object often encapsulates business logic for the corresponding row to ensure that the desired business rules are consistently enforced. An entity object may also be associated with other entity objects to reflect relationships existing between rows in the underlying database.

B. Mobile Cloud Infrastructure

Figure 2:
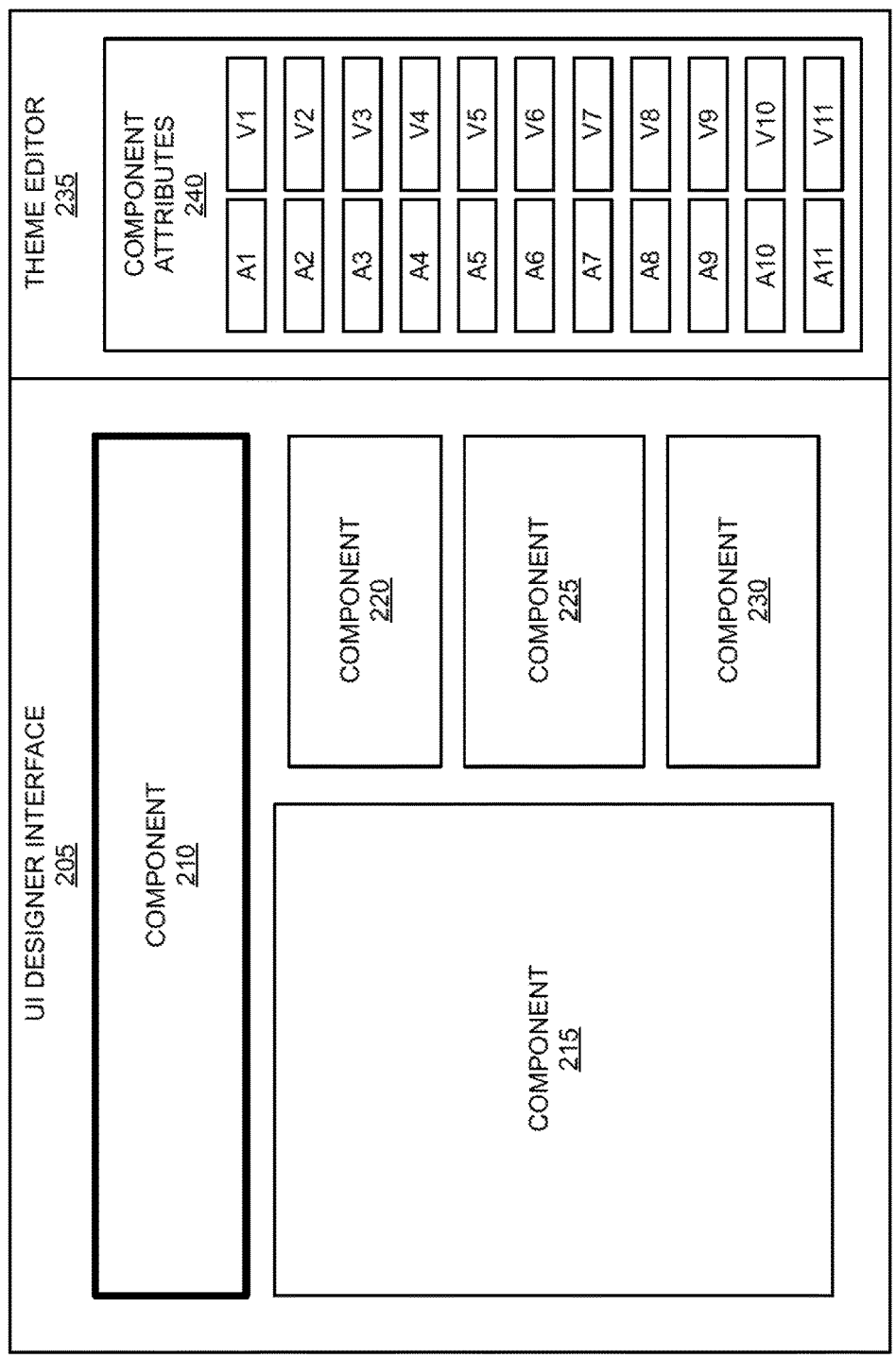
FIG. 2 is an illustration of a workspace for creating and theming user interfaces according to one embodiment.

FIG. 2 is a simplified block diagram of one or more components of a system environment 200 by which services provided by one or more components of an embodiment system may be offered as cloud services, in accordance with an embodiment of the present disclosure. In the illustrated embodiment, system environment 200 includes one or more client computing devices 204, 206, and 208 that may be used by users to interact with cloud infrastructure system 202 that provides cloud services. Client computing devices 204, 206, and 208 may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in FIG. 2 may have other components than those depicted. Further, the embodiment shown in FIG. 2 is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. Client computing devices 204, 206, and 208 can be general purpose personal computers including, by way of example, personal computers and/or laptop computers running various versions of Microsoft Windows®, Apple Macintosh®, and/or Linux operating systems. Client computing devices 204, 206, and 208 can be workstation computers running any of a variety of commercially-available UNIX® or UNIX-like operating systems, including without limitation the variety of GNU/Linux operating systems, such as for example, Google Chrome OS. Alternatively, or in addition, client computing devices 204, 206, and 208 may be any other electronic device, such as a thin-client computer, an Internet-enabled gaming system (e.g., a Microsoft Xbox gaming console with or without a Kinect® gesture input device), and/or a personal messaging device, capable of communicating over network(s) 210.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially available protocols, including those described above for network(s) 210. Network(s) 210 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 210 can be a local area network (LAN), such as one based on Ethernet, Token-Ring and/or the like. Network(s) 210 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Cloud infrastructure system 202 may comprise one or more computers and/or servers (not shown). Computers and/or servers associated with cloud infrastructure system 202 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, computers and/or servers associated with cloud infrastructure system 202 may be adapted to run one or more services or software applications described in the foregoing disclosure.

Computers and/or servers associated with cloud infrastructure system 202 may run an operating system including any of those discussed above, as well as any commercially available server operating system. Computers and/or servers associated with cloud infrastructure system 202 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, cloud infrastructure system 202 may include one or more applications to analyze, consolidate, or process requests, data feeds, and/or event updates received from users of client computing devices 204, 206, and 208. As an example, client computing devices 204, 206, and 208 may send one or more requests to an application to create, update, or delete data. In another example, client computing devices 204, 206, and 208 may send data feeds and/or event updates that include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Cloud infrastructure system 202 may also include one or more applications to display processed request, data feeds, and/or real-time events via one or more display devices of client computing devices 204, 206, and 208.

In certain embodiments, services provided by cloud infrastructure system 202 may include a host of services that are made available to users of cloud infrastructure system 202 on demand, such as online data storage and backup solutions, Web-based e-mail services, hosted office suites and document collaboration services, database processing, managed technical support services, application development frameworks, and the like. Services provided by cloud infrastructure system 202 can dynamically scale to meet the needs of its users. A specific instantiation of a service provided by cloud infrastructure system 202 is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a cloud infrastructure system 202 may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site. In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by cloud infrastructure system 202 via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 202 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by cloud infrastructure system 202 and also control the deployed services. In some embodiments, platform services provided by cloud infrastructure system 202 may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud.

Middleware cloud services may provide a platform for customers to develop and deploy various business applications, and Java cloud services may provide a platform for customers to deploy Java applications, in cloud infrastructure system 202.

Various different mobile cloud services may be provided by mobile cloud service (MSC) 212 in cloud infrastructure system 202. MCS 212 facilitates communication between a mobile computing device and enterprise computer systems (e.g., enterprise computer systems 224 and 226) according to some embodiments of the present invention. MCS 212 may include one or more memory storage devices ("local storage") used to store enterprise data and authentication information. Enterprise data may be received from enterprise computer systems 224 or 226 or from mobile computing devices 204, 206, or 208 or may include enterprise data converted by cloud infrastructure system 202, or combinations thereof. Authentication information may be received from identity management system 216 and/or generated by cloud infrastructure system 202. In some embodiments, authentication information may include information indicating security authentication of a user with regard to a request for a service.

Enterprise computer systems, such as enterprise computer systems 224 and 226 may be physically located beyond a firewall of cloud infrastructure system 202 at a different geographic location (e.g., remote geographic location) than cloud infrastructure system 202. In some embodiments, enterprise computer system 224 may be different from enterprise computer system 226. In some embodiments, enterprise computer system 224 and enterprise computer system 226 may be part of a single computer system. Each of enterprise computer systems 224 and 226 may communicate with cloud infrastructure system 202 using a different communications protocols. Enterprise computer system 224 and enterprise computer system 226 may support the same or different security protocols. In some embodiments, MSC 2112 may include an agent system to handle communication with enterprise computer systems 224 and 226.

In certain embodiments, one or more of enterprise computer systems 224 or 226 may communicate with cloud infrastructure system 202 using one or more different protocols. A protocol may include a communication protocol, such as SPDY. A protocol may include an application protocol such as an HTTP-based protocol. In some embodiments, enterprise computer systems 224 or 226 may communicate with cloud infrastructure system 202 using a REST or SOAP communication protocols. For example, REST protocol may support a formats including URI or URL. Enterprise Data formatted for communication using REST protocol may be easily converted to data formats such as JSON, comma-separated values (CSV), and really simple syndication (RSS). Enterprise computer systems 224 or 226 and cloud infrastructure system 202 may communicate using other protocols such as remote procedure calls (RPC) (e.g., XML RPC).

In some embodiments, MCS 212 may include an adaptor interface configured to support communication with one or more services provided by cloud infrastructure service 202, some of which may support different protocols or techniques for communications. In some embodiments, MCS 212 may include an adaptor interface configured to support communication with enterprise computer systems 224 or 226, some of which may support different protocols or techniques for communications. MCS 212 may include one or more adaptors each of which may be configured to communicate according to a communication protocol, a type of enterprise computer system, a type of application, a type of service, or combinations thereof. A communication protocol supported by an adaptor may be specific to a service or one or more of enterprise computer systems 224 or 226.

In certain embodiments, mobile computing devices 204, 206, and 208 may each implement an application that can provide specific user interfaces to communicate with MCS 212. A specific UI may be configured to communicate using a specific communication protocol. In some embodiments, specific UIs may include callable interfaces, functions, routines, methods, and/or operations that may be invoked to communicate with MCS 212. Specific UIs may accept as input parameters for communicating with a service provided by cloud infrastructure service 202 or with enterprise computer systems 224 or 226 for enterprise data and/or to request a service. In some embodiments, communication through MCS 212 may be converted for communication using a custom communication protocol. In some embodiments, specific UIs may correspond to a custom client in an application.

MCS 212 may include one or more callable interfaces, e.g., an application programming interface (API). Callable interfaces associated with MCS 212 may enable an app on a mobile computing device to communicate requests to MCS 212. Callable interfaces associated with MCS 212 may support a common or standard interface, which may allow requests including their parameters to be received from apps according to a standardized protocol, architectural style, and/or format (e.g., a REST protocol). Callable interfaces associated with MCS 212 may be configurable by a user of any one of computing devices 204, 206, or 208. Callable interfaces associated with MCS 212 may receive requests for services according to a communication protocol. Device application developers can connect to MCS 212 for their custom applications. In some embodiments, a callable interface associated with MCS 212 may be configured by the same person that develops an app, such that the person can implement a custom app to communicate with MCS 212.

Callable interfaces associated with MCS 212 may further enable enterprise computer systems 224 or 226 to communicate with MCS 212 according to a standardized protocol or format. Similar to application developers, those who manage enterprise computer systems can implement code (e.g., an agent system) that is configured to communicate with MCS 212 via one or more callable interfaces. Callable interfaces associated with MCS 212 may be implemented based on a type of a computing device, a type of enterprise computer systems, an app, an agent system, a service, a protocol, or other criterion. In some embodiments, callable interfaces associated with MCS 212 may support requests for services including authentication, compression, encryption, pagination with cursors, client-based throttling, non-repudiation, logging, and metrics collection. In some embodiments, callable interfaces associated with MCS 212 may be implemented for custom business-related services, such as authentication, policy enforcement, caching of responses, throttling of calls to MCS 212, translation between asynchronous and synchronous patterns, logging of calls to underlying services, or combinations thereof. In some embodiments, callable interfaces associated with MCS 212 may enable users to load custom code for implementation by cloud infrastructure system 202. The custom code may implement one or more callable interfaces associated with MCS 212 for cloud infrastructure system 202, which can enable users to access custom services or other enterprise computer systems.

Protocol translators associated with MCS 212 may process a message to determine a communication protocol for a message and/or to convert a message to a communication protocol for a destination. Protocol translators associated with MCS 212 may convert a request received from mobile computing devices 204, 206, or 208. The request may be converted from a format of a communication protocol supported by computing devices 204, 206, or 208 to a format of a communication protocol supported by a service provided by cloud infrastructure service 202 or enterprise computer systems 224 or 226. Protocol translators associated with MCS 212 may convert a response received from a service provided by cloud infrastructure service 202 or enterprise computer systems 224 or 226. A response may be converted from a format of a communication protocol supported by a service provided by cloud infrastructure service 202 or enterprise computer systems 224 or 226 to a format of a communication protocol supported by mobile computing devices 204, 206, or 208.

Security services associated with MCS 212 may manage security authentication for requests received from any of mobile computing devices 204, 206, or 208. Security services associated with MCS 212 may protect the integrity of customer processes and enterprise data. To prevent system or data from being compromised, security authentication may occur when a request is received from mobile computing devices 204, 206, or 208. Security authentication may be performed before a request is dispatched for processing by cloud infrastructure system 202. The security authentication determined for a user may enable a user associated with a mobile computing device to have authorization to request services via MCS 212. The security authentication may reduce efforts for a user to authenticate for different requests and/or services requested via MCS 212. Security services associated with MCS 212 may be implemented as one or more functional blocks or modules configured to perform various operations authenticating security of a request.

Authentication services associated with MCS 212 may manage security authentication for requests received from mobile computing devices 204, 206, or 208. Authentication services associated with MCS 212 may determine security authentication for a user associated with a computing device that sends a request to MCS 212. Security authentication may be determined based on a time period, which may be tied to operation of an app (e.g., launching an app), a request, a computing device, an enterprise computer system, other criterion related to a request, or combinations thereof. Security authentication may be verified and granted for any one of the following, such as an individual request, one or more enterprise computer systems, a particular service, a type of service, a user, a computing device, other criterion for determining security authentication, or combinations thereof. In some embodiments, cloud infrastructure system 202 may store authentication information of users received from enterprise computer systems or authentication systems supporting enterprise computer systems. Cloud infrastructure system 202 may determine authentication by performing a lookup function to determine whether an identity of a user associated with a request has authority to make such a request. The stored authentication information may include information such as the type of requests, functions, enterprise computer systems, enterprise data, or the like that a user may be authorized to access. In some embodiments, infrastructure system 202 may initiate communication with a requesting computing device to determine authentication.

In some embodiments, security authentication may be determined based on a role associated with a user requesting a service. The role may be associated with a user requesting access to MCS 212. In some embodiments, a user may request services as a subscriber or tenant of MCS 212 who may be granted access to resources and/or services provided by MCS 212. Authentication may correspond to a user's subscription to MCS 212, such that a user may be authorized to request services via MCS 212 as a subscriber. In some embodiments, the subscription may be limited to a particular set of resources provided by MCS 212. Security authentication may be based on the resources and/or services accessible to the user of MCS 212. In some embodiments, a request may be provisioned a template during execution called a "runtime environment." The runtime environment may be associated with resources that are allocated for a request, a user, or a device.

In some embodiments, authentication services associated with MCS 212 may request an identity management system to determine security authentication for the user. The identity management system may be implemented by cloud infrastructure system 202 (e.g., as identity management 216) or by another computer system that is external to cloud infrastructure system 202. Identity management 216 may determine security authentication of the user based on the user's role or subscription for accessing MCS 212. The role or subscription may be assigned privileges and/or entitlements with respect to an enterprise computer system, a service provided by an enterprise computer system, a function or feature of an enterprise computer system, other criterion for controlling access to an enterprise computer system, or combinations thereof.

As discussed above, in certain embodiments, cloud infrastructure system 202 may include identity management module 216. Identity management module 216 may be configured to provide identity services, such as access management and authorization services in cloud infrastructure system 202. In some embodiments, identity management module 216 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.) Identity management module 216 may also include the management of descriptive information about each customer and about how and by whom that descriptive information can be accessed and modified.

C. Mobile Composer

Various different infrastructure services may be provided by an IaaS platform in cloud infrastructure system 202. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 218 for providing the resources used to provide various services to customers of cloud infrastructure system 202. In one embodiment, infrastructure resources 218 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 202 may enable a first set of users in a first time zone to utilize resources of cloud infrastructure system 202 for a specified number of hours and then enable the re-allocation of the same resources to another set of users located in a different time zone, thereby maximizing the utilization of resources.

In certain embodiments, a number of internal shared services 220 may be provided that are shared by different components or modules of cloud infrastructure system 202 and by the services provided by cloud infrastructure system 202. These internal shared services 220 may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, a number of external shared services 220 may be provided that are shared by different components or modules of cloud infrastructure system 202 and by the services provided by cloud infrastructure system 202. These external shared services 220 may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In exemplary operation, a customer using a client device, such as client device 204, 206 or 208, may interact with cloud infrastructure system 202 by issuing service request 234 to one or more services provided by cloud infrastructure system 202. The customer may place a subscription order via these UIs, interact with one or more web-based applications, services, or the like. In certain embodiments, the customer may access a cloud User Interface (UI), cloud UI 228, cloud UI 230 and/or cloud UI 232 to issue service request 234. In some embodiments, service request 234 is initiated in response to the customer interacting with a local UI. After service request 234 has been made by the customer, provided service 236 is received. Provided service 236 may be received via cloud UIs, 228, 230 and/or 232.

D. Previews for CSS Preprocessing Frameworks

A CSS framework can be a standardized set of concepts, practices, and criteria for dealing with common types of problem that originate from use of the CSS language. The CSS framework can be used as a reference to help developers approach and resolve new problems of a similar nature. In the world of mobile web design, there exists a variety of frameworks defined as packages. The aim of most CSS frameworks is to provide a common structure. These can be made up of a structure of files and folders of standardized code (HTML, CSS, JS documents etc.) which can be used to support the development of user interfaces.

There are a variety of types of CSS frameworks drawn, for example, to the presentation layer of an application. A designer may have content to be presented in HTML documents with defined CSS style sheets so it can ultimately be viewed in a browser. The designer can utilize CSS source code provided by a CSS framework to create a grid in which the developer positions different elements that make up a user interface in a simple and versatile fashion. Currently the rise of responsive web design techniques, which facilitate the development of websites that can adapt to various resolutions for different mobile and desktop devices, is leading to the emergence of responsive frameworks.

Within CSS frameworks, a distinction can be drawing between at least two types of frameworks according to their complexity: simple frameworks and complete frameworks.

Simple frameworks are often called simply "grid systems." They often offer style sheets with column systems to facilitate the distribution of different elements according to an established design. Complete frameworks usually offer configurable features like styled-typography, sets of forms, buttons, icons and other reusable components built to provide navigation, alerts, popovers, and more, images frames, HTML templates, custom settings, etc.

FIG. 2 is an illustration of workspace 200 for creating and theming user interfaces according to one embodiment. In this example, workspace 200 includes UI designer interface 205. UI designer interface 205 provides a canvas onto which developers of applications can build user interfaces. UI designer interface 205 can be part of a CSS framework or part of a standalone application that utilizes one or more CSS frameworks. In various embodiments, UI designer interface 205 provides a template allowing developers to position user interface elements or components to build user interfaces. As shown in FIG. 2, UI designer interface 205 includes components, 210, 215, 220, 225, and 230 each having different sizes and arranged differently according to a predetermined layout. Other templates and layout can be utilized.

In one aspect, a developer can utilize CSS source code provided by a CSS framework to position different elements that make up a user interface. In certain embodiments, in addition to a variety of tools to create elements of user interfaces, UI designer interface 205 also provides developers tool to create the style, look, and feel of these user interfaces. The CSS source code can adapt the user interface to various resolutions for different mobile and desktop devices.

Referring again to FIG. 2, workspace 200 includes theme editor 235. Theme editor 235 provides developers with access to attributes of components 210, 215, 22, 225, and 230 than can be styled using CSS. In this example, theme editor 235 includes component attributes 240. As shown, each attribute (e.g., A1) can have a corresponding value (e.g., V1). Developers can specify values of attributes using a variety of input mechanisms, such as input fields, selection boxes, direct CSS editing, or the like.

UI designer interface 205 or theme editor 235 can be embodied as a CSS framework that includes one or more CSS preprocessors. CSS preprocessors take code written in a preprocessed language and then convert that code into CSS. Some of the more popular CSS preprocessors are Sass, LESS, and Stylus. CSS preprocessors are not CSS and therefore are not bound by the limitations of CSS. The preprocessed language can give a developer more functionality than CSS as long as it eventually makes sure everything is output as CSS.

For instance, in SASS, a developer could have a variable TEXT=blue. If the developer wanted red text, the developer could simply set TEXT=red. The resulting CSS code might look like:

```
.foo { color: red }
.bar {color: red } (and so on)
```

The more advanced the processing, the longer the time it takes to produce the resulting CSS code. There are two primary industry solutions to this, one being to attempt to mimic the results of a CSS processor by hardcoding what should change when a developer makes a change. The second is to run the preprocessor for real, and incur any performance cost. The problem with these industry solutions are that they are either expensive to build (mimic processing) or too slow and taxing (running processors for real).

In various embodiments, a developer can change an attribute of a currently selected component (e.g., component 210 with a bold outline). If the original value TEXT is "blue," and the developer wanted red text, the developer could simply set the corresponding attribute using theme editor 235. Developers are not burdened with having to write custom code that mimics the result of a preprocessor as techniques according to various embodiments provide high performant and high fidelity previews without rely on running the preprocessor whenever a change is made.

Figure 3:
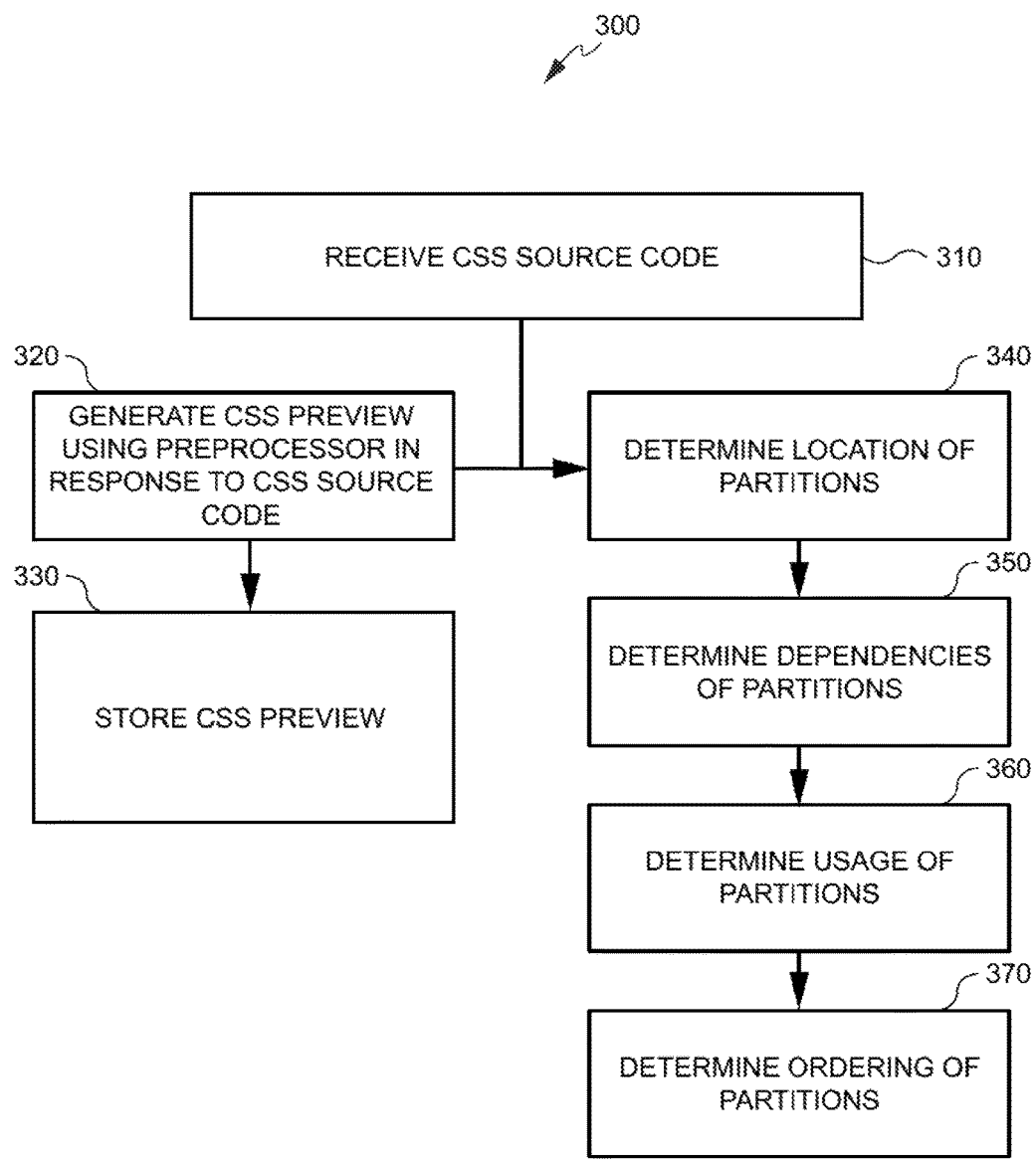
FIG. 3 is a flowchart of a method for generating a CSS preview according to one embodiment.

FIG. 3 is a flowchart of method 300 for generating a CSS preview according to one embodiment. Implementations of or processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In step 310, CSS source code written using a CSS framework is received. The CSS source code can be written using features that extend the CSS language—allow variables, mixins, functions, and many other techniques to make CSS more maintainable, themable, and extendable for developers. In step 320, a CSS preview is generated using a CSS preprocessor in response to the CSS source code. In certain embodiments, the preprocessor (e.g., Sass or LESS) interprets the CSS source code as written in a corresponding scripting language base CSS. In step 330, the CSS preview is stored. The CSS preview can be used to visualize user interfaces being built using UI designer interface 205 of FIG. 2.

In step 340, which may occur in parallel or subsequent to any preprocessor activity, locations of one or more partitions are determined using the CSS source code. In general, the CSS source code is segmented and partitioned into small parts that can be modified by the user (variables, selectors, etc.). In certain embodiments, each partition is a segment of a CSS preprocessor language defined based on a policy so that the partition is the most discreet configurable unit of a CSS pre-processor. This may include policy criteria that a partition can only have as a dependency other partitions (and no other external factors). A partition includes a set of one or more tokens. Each token is cataloged and its location in the CSS source code recorded. In one example, if the variable "header_color" is used in 50 places throughout the CSS source code, each location is recorded such that if the variable is changed by a developer in theme editor 236, the variable can be changed in each of the 50 locations throughout the CSS source code.

In step 350, dependencies are determined for the one or more partitions. Dependencies can include dependencies in variables, values, functions, preprocessor statements, or the like. In other words, a determination is made as to what is the minimal set of tokens that will be affected by a potential change. In step 360, usage is determined for the one or more partitions. For example, is the variable "header_color" used in a function, procedure, to define another variable, or the like.

In step 370, ordering of the one or more partitions is determined. There may be an order to which the variable "header_color" is applied. This ordering is determined and recorded. In certain embodiments, the ordering is defined by the rules of CSS (i.e., position in a document and selectivity based on specificity of CSS selectors).

In certain embodiments, each partition can be normalized. That can include statically completing functions, including additional source files, replacing variables, or the like as much as possible. There can be some portions that cannot be normalized, such as custom functions or language specific features.

Figure 4:
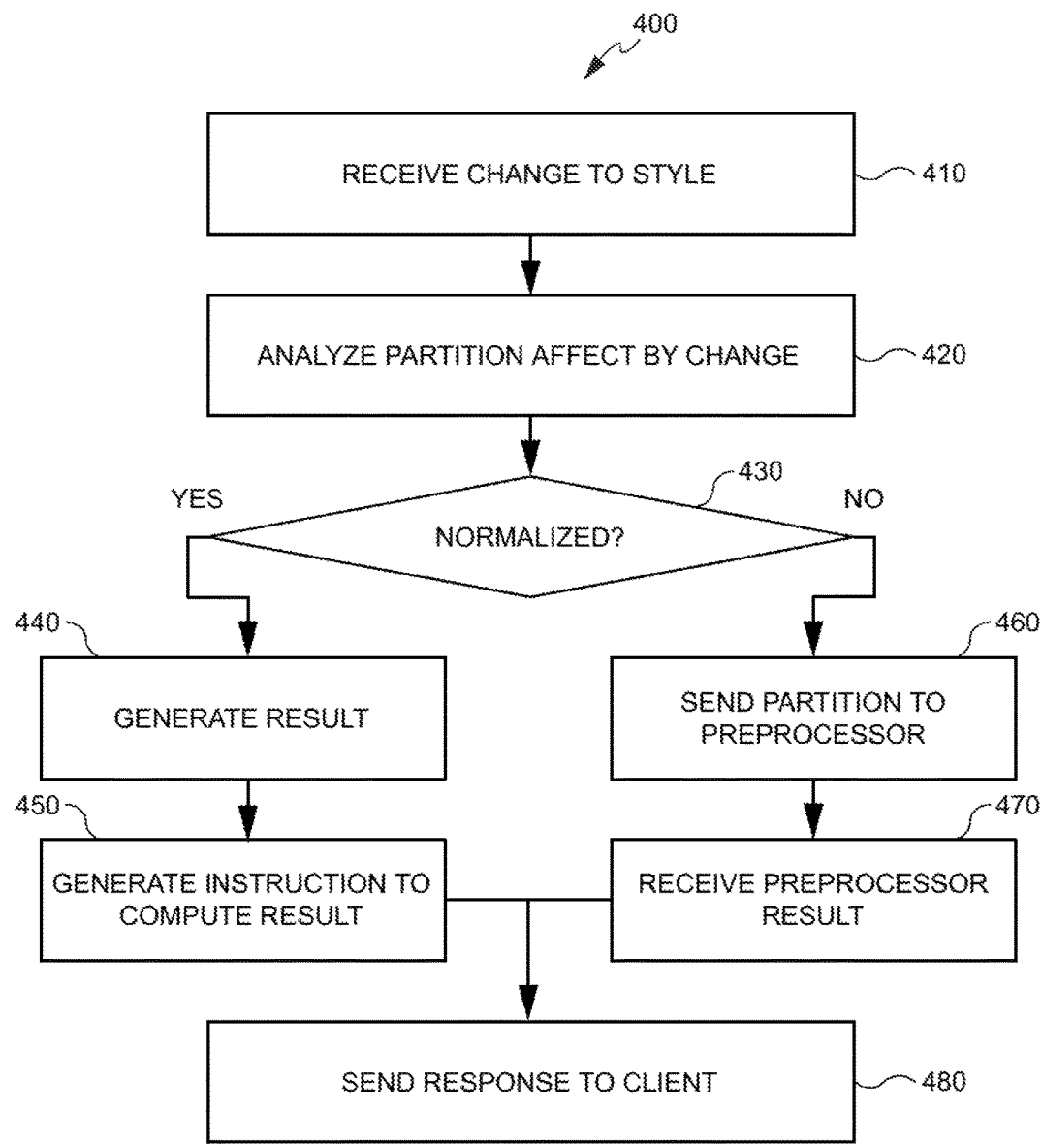
FIG. 4 is a flowchart of a method performed by a service for handling a change to style information associated with a user interface (UI) component according to one embodiment.

FIG. 4 is a flowchart of method 400 performed by a service for handling a change to style information associated with a user interface (UI) component according to one embodiment. Implementations of or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In step 410, a change to a style is received at the service from a client device. For example, a developer building user interfaces on the client device using a development framework provided by the service receives the CSS preview views the styling of the user interfaces. The developer can change one or more styles associated with all or part of a user interface (e.g., by modifying attributes or variables within the preprocessor scripting language). In response to a change to a style, the client device causes a request to be sent to the service to change to the style and receive updates CSS. In certain embodiments, the client device determines the partition affected by the change. The client device can sent the partition to the service with the change.

In step 420, the partition affected by the change is analyzed. For example, the partition is analyzed to determine whether the partition has been completely normalized or whether the partition still requires the preprocessor to do some work. Other processing may be performed to the partition at this step, for example, to inject additional information, augment aspects of the partition, decimate portions of the partition, or the like.

Accordingly, if a determination is made in step 430 that the partition has been sufficiently normalized, a result of the change to the style is computed in step 440. In various embodiments, the result can be determined using find and replace techniques. Other string manipulations techniques may be used, as these operations do not require the time or resources of running the CSS preprocessor.

In step 450, an instruction is generated that enables the client device to compute the result of the change to the style without having to resend the change to the service. The instruction includes any necessary information to regenerate the result. A response can be sent to the client device in step 480 that includes the result of the change to the style and the instruction to compute the result of future changes to the style. Since the partition can be computed in a technology agnostic fashion, it can be computed in the future solely on the client (for instance using a script execute by a web browser). This makes future changes to the same partition appear near instant to the user.

If a determination is made in step 430 that the partition has not been sufficiently normalized, the partition is sent to the CSS preprocessor in step 460. The CSS preprocessor only has to run on the partition rather than the entire CSS source code. Since the partition is significantly smaller in most instances than the entire starting preprocessor code, a result can be generated significantly faster—almost in real time.

In step 470, the result is received from the CSS preprocessor. In step 480, a response is sent to the client with the results of the CSS preprocessor. In either case, once the client device has the result, the client device can inject the resulting CSS code according to the original ordering of the partition in the preprocessed CSS code. Since CSS rules are order dependent, this ensures that the order is preserved when a change is made to just one partition.

Figure 5:
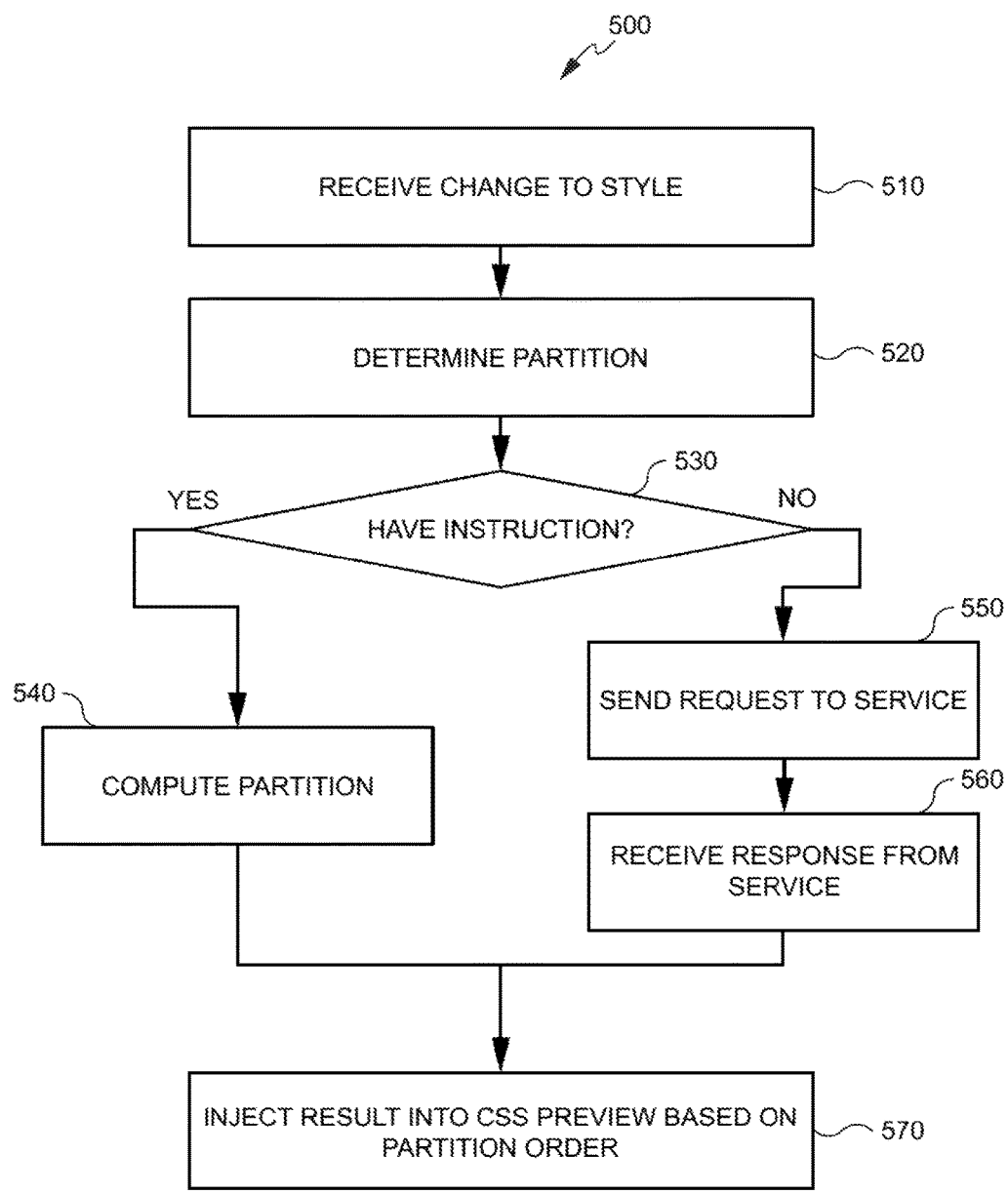
FIG. 5 is a flowchart of a method performed by a client device for handling a change to style information associated with a user interface (UI) component according to one embodiment.

FIG. 5 is a flowchart of method 500 performed by a client device for handling a change to style information associated with a user interface (UI) component according to one embodiment. Implementations of or processing in method 500 depicted in FIG. 5 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In step 510, a change to a style is received at the client device. As discussed above, a developer can change one or more styles associated with all or part of a user interface (e.g., by modifying attributes or variables within the preprocessor scripting language). In response to a change to a style, the client device determines the partition affected by the change in step 520.

In step 530, the client device determines whether it has instructions for computing the partition affected by the change. For example, the partition may have been sufficiently normalized such that the service sent an instruction that enables the client device to compute the result of the change to the style without having to resend the change to the service. The instruction previously received at the client includes any necessary information to regenerate the result in response to future changes to the style.

If a determination is made in step 530 that the client device has instructions for computing the partition affected by the change, the partition is computed in step 460. Since the partition is computed on the client device, a result can be generated significantly faster—almost appearing instantaneously. The result can then be injected into the CSS preview based on the ordering of the partition in step 570.

If a determination is made in step 530 that the client device does not have instructions for computing the partition affected by the change, a request is sent to the service in step 550. As discussed above, the request can include information identify the change to the style, the partition affected by the change, as well as other information that the service can use to provide a suitable response. The partition is computed on one or more servers associated with the service. Since the partition is significantly smaller than the entire CSS source code, a result can be generated in near real-time. In step 560, a response is received from the service that includes a result of running the CSS preprocessor on the partition. The result can then be injected into the CSS preview based on the ordering of the partition in step 570.

Conclusion

A. Distributed System

Figure 6:
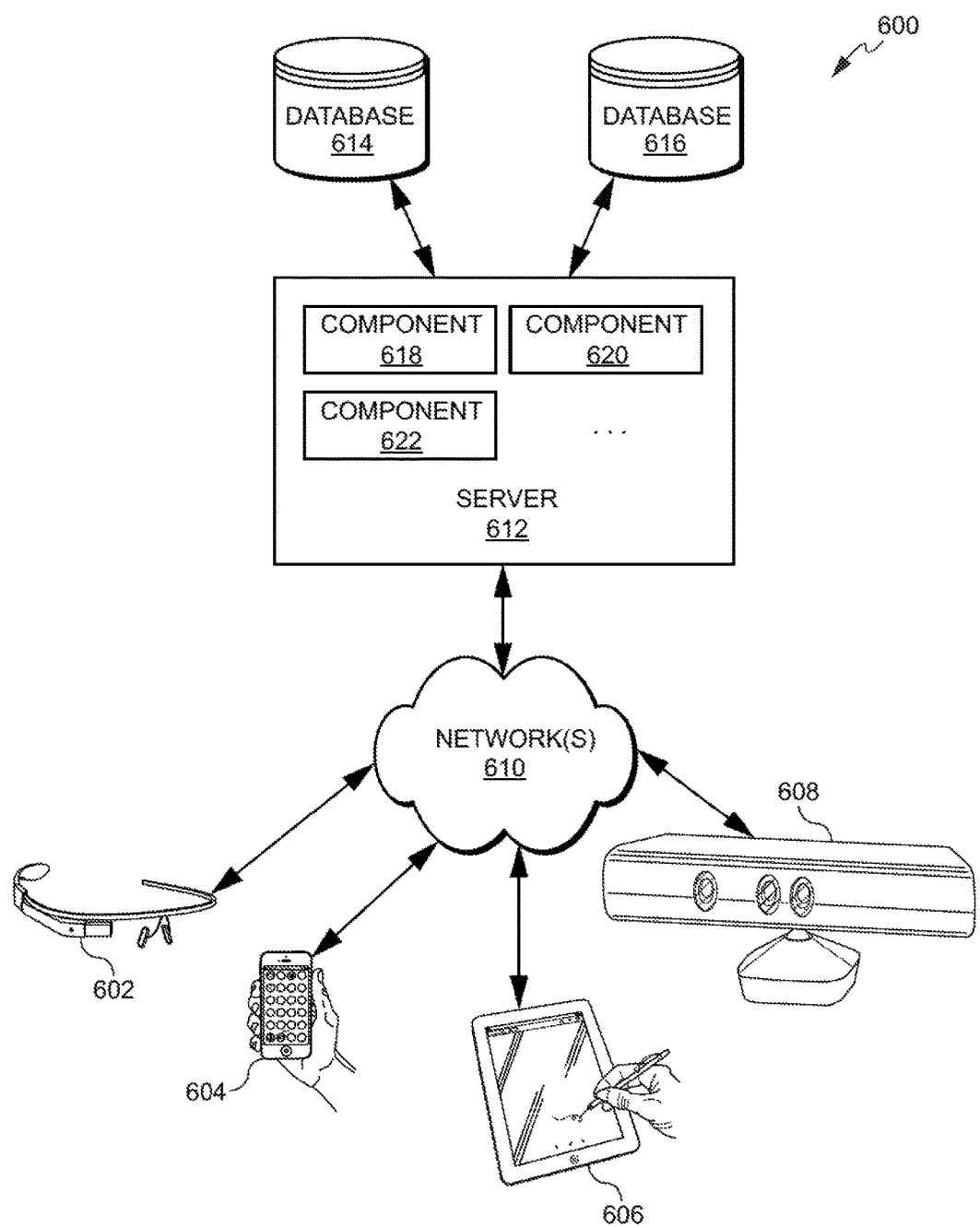
FIG. 6 depicts a simplified diagram of a distributed system for implementing one of the embodiments.

FIG. 6 depicts a simplified diagram of distributed system 600 for implementing one of the embodiments. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network 610.

In various embodiments, server 612 may be adapted to run one or more services or software applications provided by one or more of the components of the system. In some embodiments, these services may be offered as web-based or cloud services or under a Software as a Service (SaaS) model or a Platform as a Serves (PaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, software components 618, 620, and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in the figure is thus one example of a distributed system for implementing an embodiment system and is not intended to be limiting.

Client computing devices 602, 604, 606, and/or 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. Client computing devices 602, 604, 606, and/or 608 can be general purpose personal computers including, by way of example, personal computers and/or laptop computers running various versions of Microsoft Windows®, Apple Macintosh®, and/or Linux operating systems. Client computing devices 602, 604, 606, and/or 608 can be workstation computers running any of a variety of commercially-available UNIX® or UNIX-like operating systems, including without limitation the variety of GNU/Linux operating systems, such as for example, Google Chrome OS. Alternatively, or in addition, client computing devices 602, 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although exemplary distributed system 600 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 612 may be adapted to run one or more services or software applications described in the foregoing disclosure. For example, server 612 may correspond to a server for performing processing described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands.

B. Computer System

Figure 7:
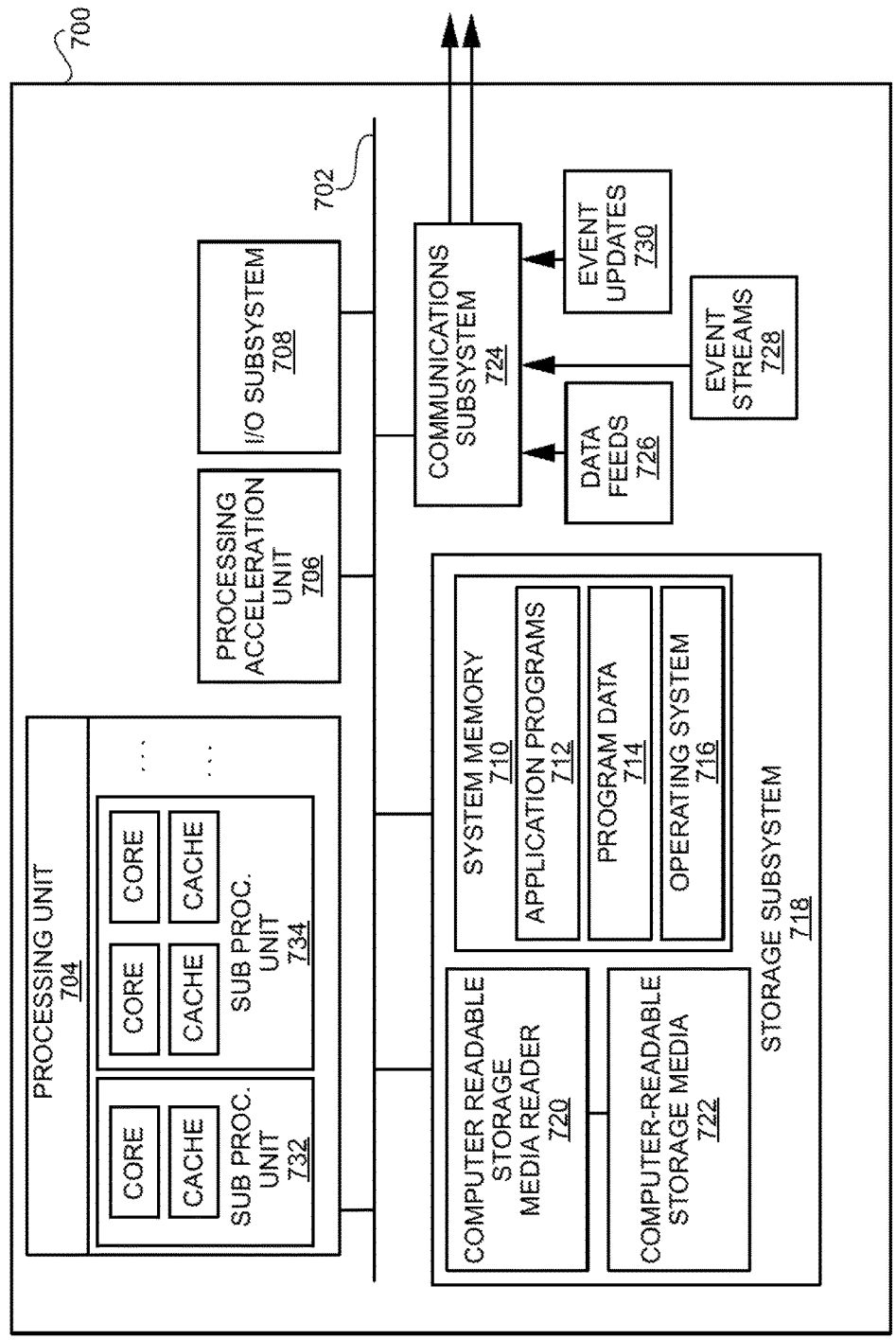
FIG. 7 illustrates an exemplary computer system, in which various embodiments of the present invention may be implemented.

FIG. 7 illustrates an exemplary computer system 700, in which various embodiments of the present invention may be implemented. The system 700 may be used to implement any of the computer systems described above. As shown in FIG. 7, computer system 700 includes bus subsystem 702 and processing unit 704 that communicates with a number of peripheral subsystems via bus subsystem 702. These peripheral subsystems may include processing acceleration unit 706, I/O subsystem 708, storage subsystem 718, and communications subsystem 724. Storage subsystem 718 includes tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 704, which can be implemented as one or more integrated circuits (e.g., a conventional microprocessor or microcontroller), controls the operation of computer system 700. One or more processors may be included in processing unit 704. These processors may include single core or multicore processors. In certain embodiments, processing unit 704 may be implemented as one or more independent processing units 732 and/or 734 with single or multicore processors included in each processing unit. In other embodiments, processing unit 704 may also be implemented as a quad-core processing unit formed by integrating two dual-core processors into a single chip.

In various embodiments, processing unit 704 can execute a variety of programs in response to program code and can maintain multiple concurrently executing programs or processes. At any given time, some or all of the program code to be executed can be resident in processor(s) 704 and/or in storage subsystem 718. Through suitable programming, processor(s) 704 can provide various functionalities described above. Computer system 700 may additionally include a processing acceleration unit 706, which can include a digital signal processor (DSP), a special-purpose processor, and/or the like.

I/O subsystem 708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 700 may comprise a storage subsystem 718 that comprises software elements, shown as being currently located within a system memory 710. System memory 710 may store program instructions that are loadable and executable on processing unit 704, as well as data generated during the execution of these programs.

Depending on the configuration and type of computer system 700, system memory 710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 704. In some implementations, system memory 710 may include multiple different types of memory, such as static random access memory (SRAM) or dynamic random access memory (DRAM). In some implementations, a basic input/output system (BIOS), containing the basic routines that help to transfer information between elements within computer system 700, such as during start-up, may typically be stored in the ROM. By way of example, and not limitation, system memory 710 also illustrates application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 718 may also provide a tangible computer-readable storage medium for storing the basic programming and data constructs that provide the functionality of some embodiments. Software (programs, code modules, instructions) that when executed by a processor provide the functionality described above may be stored in storage subsystem 718. These software modules or instructions may be executed by processing unit 704. Storage subsystem 718 may also provide a repository for storing data used in accordance with the present invention.

Storage subsystem 700 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for temporarily and/or more permanently containing, storing, transmitting, and retrieving computer-readable information.

Computer-readable storage media 722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 700.

By way of example, computer-readable storage media 722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to connect to one or more devices via the Internet. In some embodiments communications subsystem 724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

In some embodiments, communications subsystem 724 may also receive input communication in the form of structured and/or unstructured data feeds 726, event streams 728, event updates 730, and the like on behalf of one or more users who may use computer system 700.

By way of example, communications subsystem 724 may be configured to receive data feeds 726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 724 may also be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   receiving, by a computer system, cascading style sheet (CSS) source code written in CSS preprocessor language;
   generating, by the computing system, a CSS preview using a CSS preprocessor in response to receiving the CSS source code;
   segmenting, by the computer system, the CSS source code into a plurality of partitions, wherein the segmenting comprises determining a dependency of each partition in the plurality of partitions;
   receiving, by the computing system, a change to the CSS source code;
   identifying, by the computing system, a partition of the CSS source code affected by the change, wherein the partition is identified from the plurality of partitions segmented from the CSS source code, each partition is a segment of the CSS preprocessor language defined based on a policy so that the partition is a discreet configurable unit of the CSS preprocessor, and the policy includes a policy criteria that a partition can only have as a dependency other partitions;
   determining, by the computing system, whether the computing system has instructions for the identified partition that indicate how to apply one or more operations to obtain a first result of the change;
   generating, by the computing system, the first result in response to applying the one or more operations to the identified partition when the computing system has the instructions; and
   injecting, by the computer system, the first result into the CSS preview when the computing system has the instructions,
   wherein the first result is injected in the CSS preview according to the dependencies of the identified partition in the plurality of partitions, and
   wherein the computing system has the instructions when the identified partition is sufficiently normalized to exclude elements written in the CSS preprocessor language such that the first result can be generated by the computing system using the instructions without having to use the CSS preprocessor.

2. The method of claim 1, further comprising:
   sending, by the computer system, the change and the identified partition to a service that hosts the CSS preprocessor when the computing system does not have the instructions;
   receiving, by the computer system, a second result generated by the service applying the CSS preprocessor to the identified partition with the change; and
   injecting, by the computer system, the second result into the CSS preview when the computing system does not have the instructions.

3. The method of claim 1, wherein the CSS source code is written by a CSS framework using features that extend a CSS preprocessor language.

4. The method of claim 3, wherein the CSS preview displays a user interface being built using a user interface designer interface.

5. The method of claim 4, wherein the change is a change to one or more styles associated with all or part of the user interface.

6. The method of claim 1, wherein the segmenting, by the computer system, the source code into the plurality of partitions further comprises determining, by the computer system, an order for each partition in the plurality of partitions, and wherein the first result is injected in the CSS preview according to the order of the identified partition in the plurality of partitions.

7. A non-transitory computer-readable medium storing a computer program product having a set of instructions which when executed by one or more processors associated with a computer system cause the one or more processors to:
receive cascading style sheet (CSS) source code written in CSS preprocessor language;
generate a CSS preview using a CSS preprocessor in response to receiving CSS source code;
segment the CSS source code into a plurality of partitions, wherein the segmenting comprises determining a dependency of each partition in the plurality of partitions;
receive a change to the CSS source code;
identify partition of the CSS source code affected by the change, wherein the partition is identified from the plurality of partitions segmented from the CSS source code, each partition is a segment of a CSS preprocessor language defined based on a policy so that the partition is a discreet configurable unit of the CSS preprocessor, and the policy includes a policy criteria that a partition can only have as a dependency other partitions;
determine whether the computing system has instructions for the identified partition that indicate how to apply one or more operations to obtain a first result of the change;
generate the first result in response to applying the one or more operations to the identified partition when the computing system has the instructions;
send the change and the identified partition to a service that hosts the CSS preprocessor when the computing system does not have the instructions;
receive a second result generated by the service applying the CSS preprocessor to the identified partition with the change; and
inject the first result or the second result into the CSS preview,
wherein the first result is injected in the CSS preview according to the dependencies of the identified partition in the plurality of partitions, and
wherein the computing system has the instructions when the identified partition is sufficiently normalized to exclude elements written in the CSS preprocessor language such that the first result can be generated by the computing system using the instructions without having to use the CSS preprocessor.

8. The non-transitory computer-readable medium of claim 7, wherein the CSS source code is written by a CSS framework using features that extend a CSS preprocessor language.

9. The non-transitory computer-readable medium of claim 8, wherein the CSS preview displays a user interface being built using a user interface designer interface.

10. The non-transitory computer-readable medium of claim 9, wherein the change is a change to one or more styles associated with all or part of the user interface.

11. The non-transitory computer-readable medium of claim 7, wherein the segmenting the source code into the plurality of partitions further comprises determining an order for each partition in the plurality of partitions, and the first result or the second result is injected in the CSS preview according to the order of the identified partition in the plurality of partitions.

12. A system comprising:
a hardware processor; and
a memory storing a set of instructions which when executed by the processor cause the processor to:
receive cascading style sheet (CSS) source code written in CSS preprocessor language;
generate a CSS preview using a CSS preprocessor in response to receiving CSS source code;
segment the CSS source code into a plurality of partitions, wherein the segmenting comprises determining a dependency of each partition in the plurality of partitions;
receive a change to the CSS source code;
identify partition of the CSS source code affected by the change, wherein the partition is identified from the plurality of partitions segmented from the CSS source code, each partition is a segment of a CSS preprocessor language defined based on a policy so that the partition is a discreet configurable unit of the CSS preprocessor, and the policy includes a policy criteria that a partition can only have as a dependency other partitions;
determine whether the system has instructions for the identified partition that indicate how to apply one or more operations to obtain a first result of the change;
generate the first result in response to applying the one or more operations to the identified partition when the system has the instructions;
send the change and the identified partition to a service that hosts the CSS preprocessor when the system does not have the instructions;
receive a second result generated by the service applying the CSS preprocessor to the identified partition with the change; and
inject the first result or the second result into the CSS preview,
wherein the first result is injected in the CSS preview according to the dependencies of the identified partition in the plurality of partitions, and
wherein the system has the instructions when the identified partition is sufficiently normalized to exclude elements written in the CSS preprocessor language such that the first result can be generated by the system using the instructions without having to use the CSS preprocessor.

13. The system of claim 12, wherein the CSS source code is written by a CSS framework using features that extend a CSS preprocessor language.

14. The system of claim 13, wherein the CSS preview displays a user interface being built using a user interface designer interface.

15. The system of claim 14, wherein the change is a change to one or more styles associated with all or part of the user interface.

16. The system of claim 12, wherein the segmenting the source code into the plurality of partitions further comprises determining an order for each partition in the plurality of partitions, and the first result or the second result is injected in the CSS preview according to the order of the identified partition in the plurality of partitions.

* * * * *

UNITED STATES PATENT AND TRADEMARK OFFICE
CERTIFICATE OF CORRECTION

PATENT NO. : 10,311,132 B2
APPLICATION NO. : 15/484971
DATED : June 4, 2019
INVENTOR(S) : Straub et al.

Page 1 of 1

It is certified that error appears in the above-identified patent and that said Letters Patent is hereby corrected as shown below:

On the Title Page

Column 2, under Other Publications, Line 2, delete "2015," and insert -- 2016, --, therefor.

Column 2, under Abstract, Line 2, after "that" delete "allow".

In the Specification

In Column 10, Line 38, delete "(MSC)" and insert -- (MCS) --, therefor.

In Column 11, Line 4, delete "MSC" and insert -- MCS --, therefor.

In Column 17, Lines 50-51, delete "may be may be" and insert -- may be --, therefor.

In Column 21, Line 7, delete "(MSC)" and insert -- (MCS) --, therefor.

In Column 21, Line 37, delete "(MSC)" and insert -- (MCS) --, therefor.

Signed and Sealed this
Twenty-eighth Day of July, 2020

Andrei Iancu
*Director of the United States Patent and Trademark Office*